US005477463A

United States Patent [19]

Tamura

[11] Patent Number: 5,477,463

[45] Date of Patent: Dec. 19, 1995

[54] APPARATUS AND METHOD FOR MAKING ELECTRIC WIRE FOR HARNESS

[75] Inventor: Yoshikazu Tamura, Yokkaichi, Japan

[73] Assignee: Sumitomo Wiring Systems, Ltd., Japan

[21] Appl. No.: 206,460

[22] Filed: Mar. 4, 1994

[30] Foreign Application Priority Data

Mar. 9, 1993 [JP] Japan .................................. 5-076224

[51] Int. Cl.$^6$ ........................................ G06F 19/00

[52] U.S. Cl. ..................... 364/468; 29/33 M; 29/564.4; 29/857; 81/9.51; 364/474.09

[58] Field of Search .............................. 364/468, 474.01, 364/474.09; 29/564.4, 564.8, 566.2, 566.3, 748, 33 M, 749, 867, 857; 81/9.51; 83/907, 947, 950, 72, 73, 74, 76.6–76.8, 76.1, 360, 361, 363, 369, 370; 140/139, 140

[56] References Cited

U.S. PATENT DOCUMENTS 4,879,926 11/1989 Wollermann et al. .................. 81/9.51
4,888,867 12/1989 Maack et al. ............................ 29/857
4,993,147 2/1991 Carpenter et al. ................ 29/564.4 X
5,038,457 8/1991 Yasushi et al. ........................ 29/564.4
5,153,839 10/1992 Cross ............................ 364/474.11 X
5,282,311 2/1994 Tamura ............................ 29/564.4 X
5,343,605 9/1994 Nazerian et al. ...................... 29/33 M

*Primary Examiner*—Joseph Ruggiero
*Attorney, Agent, or Firm*—Jordan B. Bierman; Bierman and Muserlian

[57] ABSTRACT

An apparatus is provided for making an electric wire for a harness which includes a wire cutting portion for cutting a supplied wire to form the harness electric wire of a predetermined length from the wire. The apparatus comprises a sensor (8) positioned upstream of the wire cutting portion for detecting a portion to be removed from the wire to output a detection signal, a position arithmetic portion (9) for calculating the position of the portion to be removed on the basis of the detection signal outputted from the sensor (8), a removal range arithmetic portion (10) for determining the range of a removal wire in the wire having the portion to be removed on the basis of the position of the portion to be removed specified by the position arithmetic portion (9) and information about the length of the harness electric wire, and a discrimination controller (12) for discriminating between the removal wire removed from the wire and the harness electric wire. The defective electric wires are previously discriminated from an electric wire to be formed into the harness electric wire. A need is eliminated or reduced for searching for the defective electric wires after the production of the harness electric wires, and terminal losses are prevented.

13 Claims, 12 Drawing Sheets

J>J'

J≤J'

APPARATUS AND METHOD FOR MAKING ELECTRIC WIRE FOR HARNESS

BACKGROUND OF THE INVENTION

1. Field of the Invention

The present invention relates to an apparatus and method for making an electric wire for a harness which are well suited for use in production of an electric wire for a vehicular harness.

2. Description of the Prior Art

In FIG. 9, the reference character W designates a terminal-equipped electric wire for a harness which includes an electric wire W0 provided by cutting a wire to length and terminals T crimped and connected to opposite ends of the electric wire W0. A known apparatus for making the terminal-equipped harness electric wire W of FIG. 9 is shown in FIG. 10.

The apparatus for making the harness electric wire shown in FIG. 10 comprises a cut length setting portion 201, a wire supply portion 202, an electric wire length measuring portion 203, a cutting and stripping portion 204, a first terminal crimping portion 205, a second terminal crimping portion 206, and a stock portion 207. In the apparatus of FIG. 10, the electric wire length measuring portion 203 measures the feed of a coated wire supplied sequentially from the wire supply portion 202, and the cutting and stripping portion 204 cuts the wire each time the feed of the wire measured by the electric wire length measuring portion 203 equals a value set by the cut length setting portion 201, thereby to form a harness electric wire having a predetermined length. Further, in the apparatus of FIG. 10, the cutting and stripping portion 204 exposes a core wire at opposite ends of the harness electric wire, and the first and second terminal crimping portions 205, 206 crimp terminals to connect the terminals to the exposed core wire, thereby to form the terminal-equipped harness electric wire W as shown in FIG. 9. The stock portion 207 is provided for storing the thus produced terminal-equipped harness electric wires W.

In the wire supply portion 202 is prepared an annular coil of wire A as shown in FIG. 11, one end of the coil of wire A being introduced into the electric wire length measuring portion 203-through a pulley not shown. Thus, a new coil of wire must be provided if the wire in the coil A is exhausted or if a need arises to change the size, color, kind or the like of the wire. For using the new coil of wire after the complete exhaustion of the coil of wire A, it is necessary to temporarily interrupt the drive of the apparatus and to perform a cumbersome operation of setting the wire to the electric wire length measuring portion 203, resulting in lowered production efficiency. When the new coil of wire is used, it is a customary practice to join the core wire at an initial end of a wire Wb in a new coil of wire B to the core wire at a terminal end of a wire Wa introduced from the coil of wire A toward the electric wire length measuring portion 203 as shown in FIG. 12 before the wire in the old coil A is completely exhausted, to prevent the intermission of the continuity of the wires.

The conventional apparatus has sequentially produced the terminal-equipped harness electric wires W independently of the presence of the joint formed between the wire in the old coil A and the wire in the new coil B as above described. An operator has visually confirmed the discharged terminal-equipped harness electric wires to discriminate the terminal-equipped harness electric wire having the joint from acceptable products.

However, as no choice is allowed but to produce the terminal-equipped harness electric wires independently of the presence of the joint in the conventional manner, the operator has been required to previously determine the number of products in consideration for the number of joints or to add the amount of shortage to the number of products after interruption of the apparatus in order to automatically make a predetermined number of harness electric wires. Furthermore, the harness electric wire having the joint has been scrapped after the terminals are attached thereto, resulting in losses of terminals as well as of wires.

Another problem with the conventional apparatus is that the terminal-equipped harness electric wire with the joint must be found out by visual check, thereby lowering operation efficiency.

The foregoing problems arise not only in discrimination between the allowable products and the harness electric wires having the joint but also in discrimination between the allowable products and harness electric wires having a portion to be removed such as a flaw on the coating. In particular, for discrimination between the allowable products and the harness electric wires having the portion to be removed such as a flaw on the coating, it is difficult to previously obtain the number of defective harness electric wires. This requires additional production of the electric wires equalling, in number, the defective products visually discovered.

SUMMARY OF THE INVENTION

The present invention is intended for an apparatus for making an electric wire for a harness, the apparatus including a wire cutting portion for cutting a supplied wire to form the harness electric wire of a predetermined length from the wire. According to the present invention, the apparatus comprises: a sensor positioned upstream of the wire cutting portion in a supply direction of the wire br detecting a portion to be removed from the wire to output a detection signal; position specifying means for specifying the position of the portion to be removed on the basis of the detection signal outputted from the sensor; removal wire distinguishing means for determining a removal wire having the portion to be removed on the basis of the position of the portion to be removed specified by the position specifying means and information about the length of the harness electric wire; and discriminating means for discriminating between the removal wire cut from the wire and the harness electric wire on the basis of information about the removal wire determined by the removal wire distinguishing means.

In the apparatus, the sensor detects the portion to be removed from the wire at a position upstream of the wire cutting portion, and the position specifying means specifies the position of the portion to be removed on the basis of the detection signal of the sensor. The removal wire distinguishing means determines the removal wire having the portion to be removed on the basis of the length of the harness electric wire and the position of the portion to be removed specified by the position specifying means. The discriminating means discriminates between the removal wire and the harness electric wire, whereby a constant processing is performed on the removal wire.

According to the apparatus, since the removal wire having the portion to be removed is not used for production of the harness electric wire, the step of searching for the defective electric wire after the production is reduced or eliminated. Crimping terminals to connect the terminals to the wire having the portion to be removed is previously avoided, preventing terminal losses and reduction in operating efficiency.

The present invention is also intended for a method of making an electric wire for a harness, the method including cutting a supplied wire at a predetermined cut position to form the harness electric wire of a predetermined length. According to the present invention, the method comprises the steps of: detecting a portion to be removed from the wire at a location upstream of the cut position in a supply direction of the wire; determining the position of the portion to be removed if the portion to be removed from the wire is detected in the preceding step; and specifying a removal wire having the portion to be removed on the basis of the position of the portion to be removed and the length of the harness electric wire.

In the method, a joint between wires and a damaged portion on the coating of the wire are detected as a portion to be removed. The removal wire having the portion to be removed is specified on the basis of the position of the portion to be removed with respect to the predetermined reference position and the length of the harness electric wire and is then separated, thereby enabling the discrimination between the harness electric wire and the removal wire.

According to the method, the removal wire having the portion to be removed is separated from the wire, whereby the harness electric wires are discriminated between good wires and removal wires. Confirming the presence of the defective electric wires after the production of the harness electric wires may be reduced or omitted.

In another aspect of the present invention, the method comprises the steps of: detecting a portion to be removed from the wire at a predetermined location upstream of the cut position in a supply direction of the wire; determining the length of a first part of the wire between the cut position and the predetermined location; determining the number of harness electric wires of the predetermined length formed from the first part of the wire on the basis of the length of the first part of the wire and the length of the harness electric wire and determining the range of a removal wire from the first part of the wire, the removal wire being other than a second part of the wire corresponding to the determined number of harness electric wires and having the portion to be removed; and cutting opposite ends of the removal wire at the cut position to separate the removal wire.

In this method, a joint between wires and a damaged portion on the coating of the wire are detected as a portion to be removed. The number of harness electric wires is determined which are formed from the part of the wire between the cut position of the wire by the wire cutting portion and the detected portion to be removed on the basis of the length of the part of the wire between the cut position of the wire by the wire cutting portion and the detected portion to be removed and the length of the harness electric wire. The part of the wire between the cut position and the detected portion to be removed and not used for formation of the harness electric wires is determined as the removal wire together with the portion to be removed. The separation of the removal wire permits the discrimination between the harness electric wires and the removal wires.

According to the method, the number of harness electric wires made from the good wire is determined, whereby constant, correct production of a predetermined number of harness electric wires is accomplished.

It is an object of the present invention to provide an apparatus and method for making an electric wire for a harness which automatically prevent the production of a defective harness electric wire having a joint or the like.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
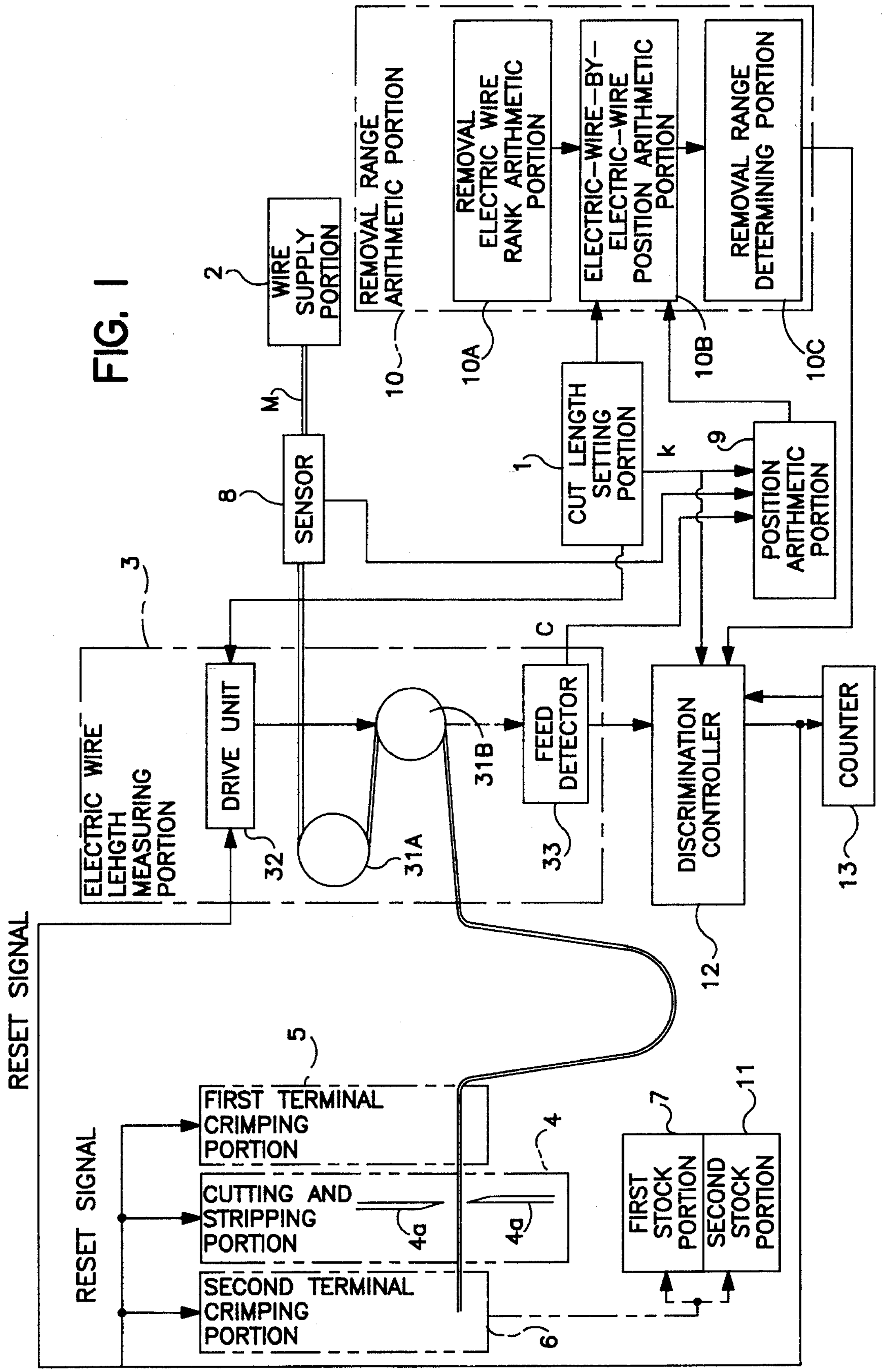
FIG. 1 schematically illustrates an apparatus for making an electric wire for a harness according to the present invention.

FIG. 1 schematically illustrates an apparatus for making an electric wire for a harness according to the present invention.

The apparatus of FIG. 1 comprises a cut length setting portion 1, a wire supply portion 2, an electric wire length measuring portion 3, a cutting and stripping portion 4, a first terminal crimping portion 5, a second terminal crimping portion 6, and a first stock portion 7. The cut length setting portion 1, wire supply portion 2, electric wire length measuring portion 3, cutting and stripping portion 4, first terminal crimping portion 5, second terminal crimping portion 6, and first stock portion 7 of FIG. 1 correspond to the cut length setting portion 201, wire supply portion 202, electric wire length measuring portion 203, cutting and stripping portion 204, first terminal crimping portion 205, second terminal crimping portion 206, and stock portion 207 of the conventional apparatus of FIG. 10, respectively.

The apparatus, as shown in FIG. 1, further comprises a sensor 8, a position arithmetic portion 9, a removal range arithmetic portion 10, a second stock portion 11 for removal wires, a discrimination controller 12, and a counter 13 so as to prevent the harness electric wires from having a defective portion of wire such as a joint between wires or a damaged portion in the coating of the wire.

The cut length setting portion 1 is provided for accepting the length of the harness electric wire to be formed and includes a keyboard and the like. The length of the harness electric wire entered from the cut length setting portion 1 is applied to a drive unit 32 of the electric wire length measuring portion 3, the position arithmetic portion 9, the removal range arithmetic portion 10, and the discrimination controller 12.

Figure 10:
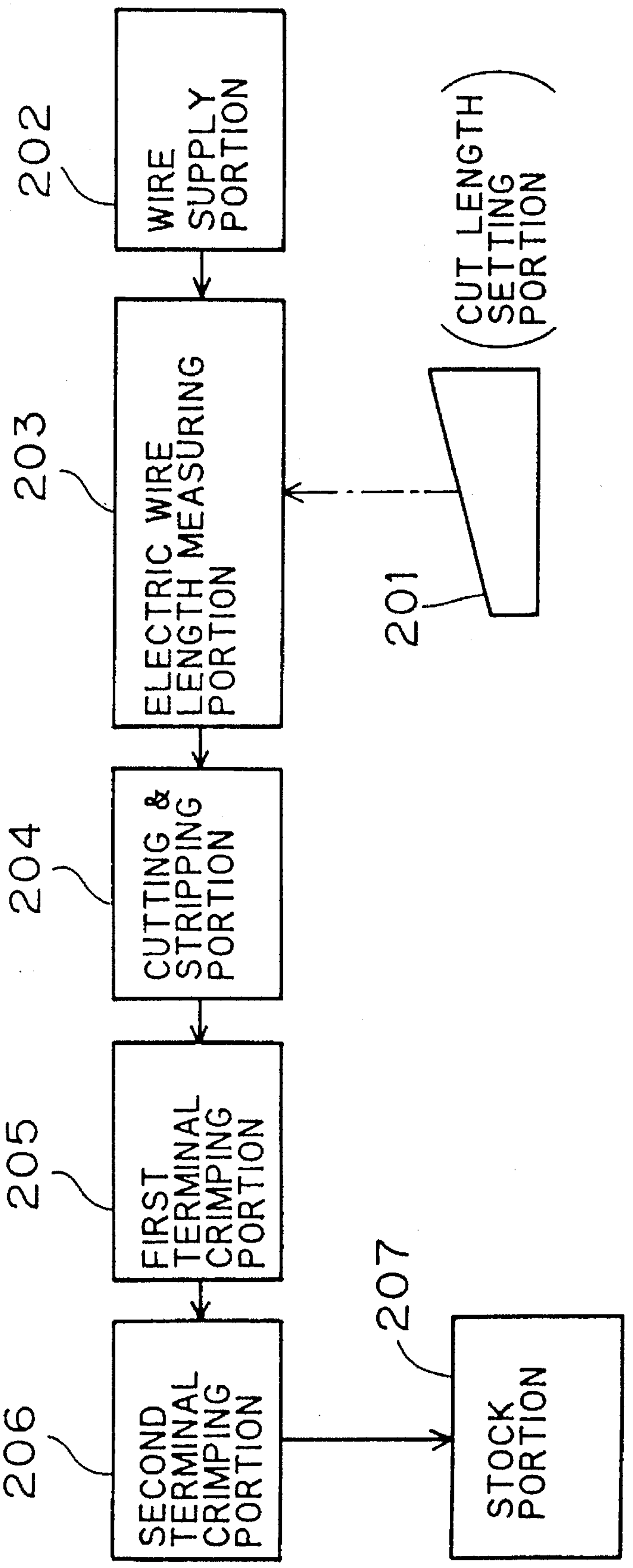
FIG. 10 schematically illustrates a conventional apparatus for making the harness electric wire.
Figure 11:
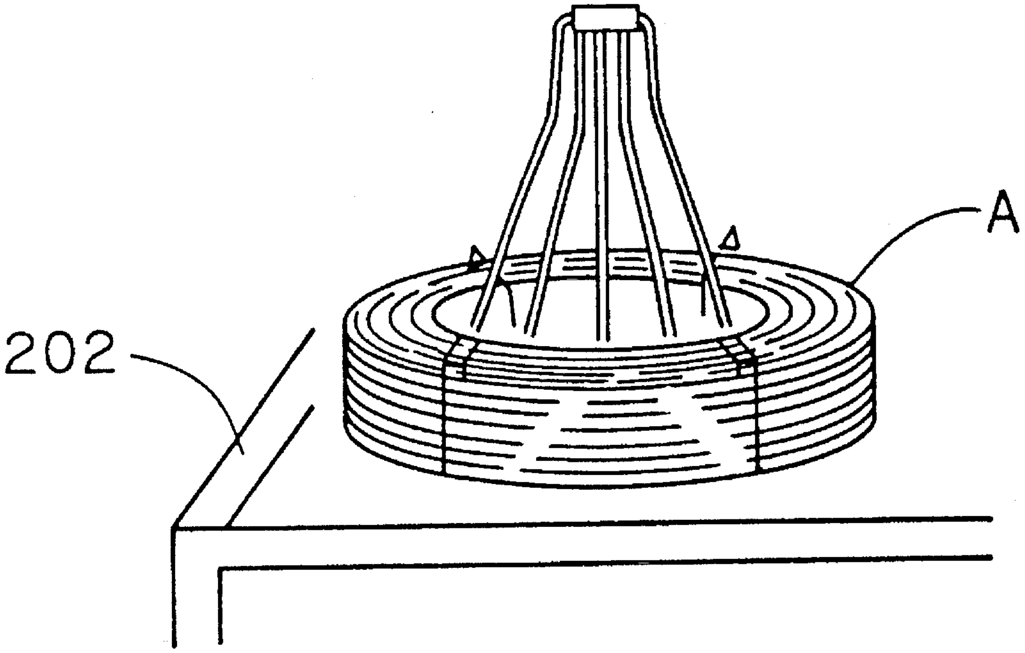
FIG. 11 is a perspective view of a coil of wire.
Figure 12:
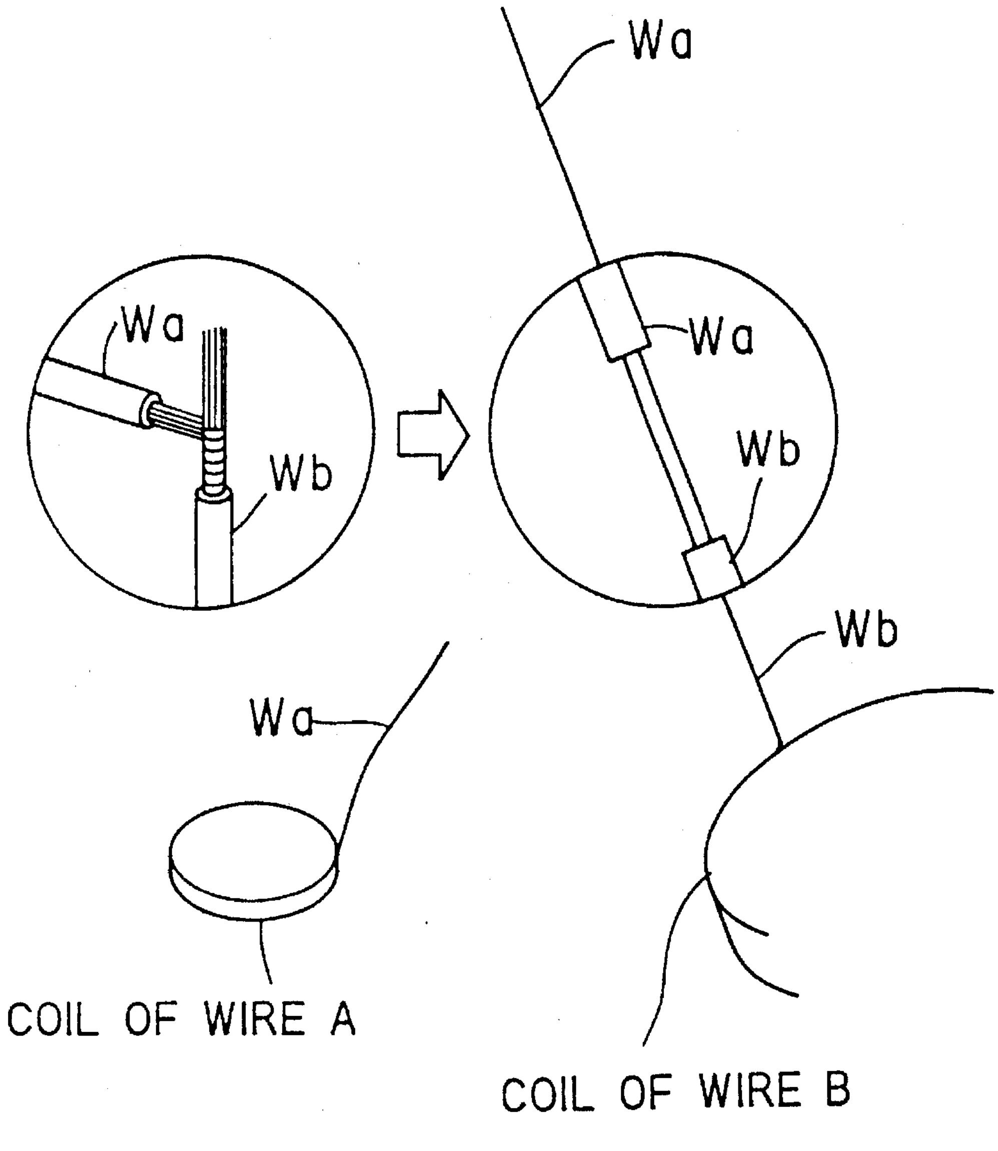
FIG. 12 illustrates a joint of the wires.

The wire supply portion 2 of FIG. 1 is completely identical with the wire supply portion 202 of FIG. 10 and the detailed description thereof will be omitted herein.

The electric wire length measuring portion 3 includes a pair of feed rollers 31A, 31B, the drive unit 32 for rotating the feed rollers 31A, 31B, and a feed detector 33.

The feed rollers 31A, 31B and the drive unit 32 feed a wire M supplied from the wire supply portion 2 toward the cutting and stripping portion 4. The feed surface of the downstream feed roller 31B is knurled so that the number of rotations thereof correctly coincides with the feed of the wire M. The feed roller 31B forms a part of the feed detector 33 to be described later and having a plurality of circumferential slits (not shown). The drive unit 32 temporarily interrupts the drive of the feed rollers 31A, 31B each time the drive unit 32 receives a reset signal from the discrimination controller 12 to be described later.

Figure 2:
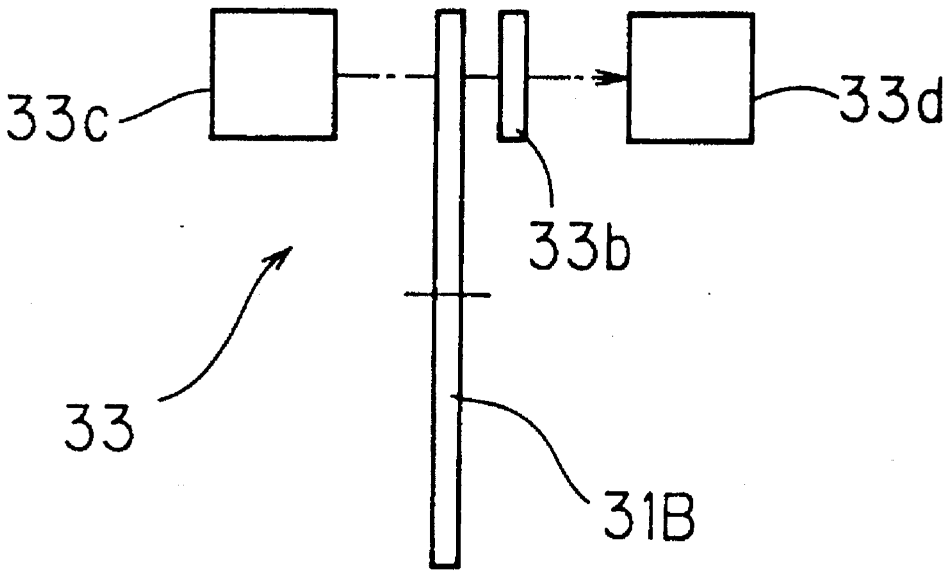
FIG. 2 illustrates a rotary encoder.

The feed detector 33 is a known rotary encoder using the feed roller 31B as a rotor plate. Referring to FIG. 2, the feed detector 33 includes the feed roller 31B, a fixed plate 33*b*, a light emitting portion 33*c*, and a light receiving portion 33*d* for outputting pulses the number of which corresponds to the number of rotations of the feed roller 31B or the feed of the wire M. The pulses outputted from the light receiving portion 33*d* are applied to the position arithmetic portion 9 and the discrimination controller 12 to be described later.

The cutting and stripping portion 4 is positioned downstream of the electric wire length measuring portion 3. Each time the cutting and stripping portion 4 receives the reset signal from the discrimination controller 12 to be described below, the cutting and stripping portion 4 drives cutting edges 4a thereof to cut the wire M, thereby to form a harness electric wire of a predetermined length at a position downstream of the cutting and stripping portion 4. The cutting and stripping portion 4 is capable of stripping the coating from the cut electric wire at its front end by means of the cutting edges 4a and capable of stripping the coating therefrom at its rear end by means of second cutting edges not shown. A stripping mechanism of the cutting and stripping portion 4 is well known in the art, and the description thereof will be omitted herein.

In the apparatus of FIG. 1, the feed rollers 31A, 31B and other rollers (rollers other than the feed rollers 31A, 31B are not shown) are arranged such that the wire of a predetermined length L lies between an electric wire cut position of the cutting edges 4*a* of the cutting and stripping portion 4 and the sensor 8 to be described later.

On receipt of a drive signal from the discrimination controller 12 to be described later, the first terminal crimping portion 5 crimps a first crimp terminal (not shown) to connect the first crimp terminal to the front end of the harness electric wire cut by the cutting and stripping portion 4. The first terminal crimping portion 5 is mechanically well known in the art.

On receipt of the drive signal from the discrimination controller 12 to be described later, the second terminal crimping portion 6 crimps a second crimp terminal (not shown) to connect the second crimp terminal to the rear end of the harness electric wire cut by the cutting and stripping portion 4. Similarly to the first terminal crimping portion 5, the second terminal crimping portion 6 is mechanically well known in the art.

The first stock portion 7 stores the harness electric wires formed by using the normal wire and is located downstream of the second terminal crimping portion 6.

Figure 3:
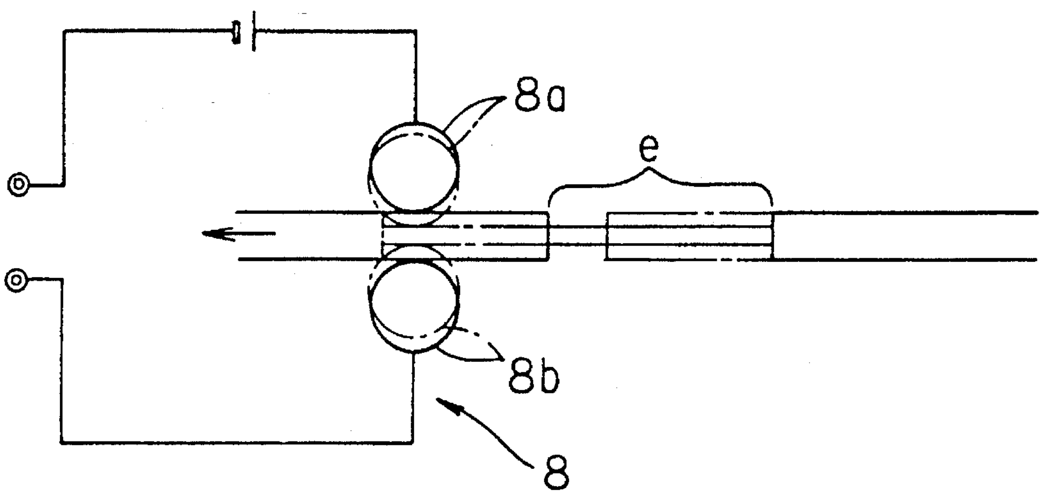
FIG. 3 illustrates a sensor.

The sensor 8, at a location upstream of the electric wire length measuring portion 3, detects a portion to be removed from the wire M supplied from the wire supply portion 3 to output a detection signal to the position arithmetic portion 9 to be described later. The portion to be removed is a joint between two coils of wire or a damaged portion on the coating of the wire. When the portion to be removed is a joint between two wires Ma and Mb, the sensor 8 which is in contact with the wires as shown in FIG. 3 may be used. The sensor 8 of FIG. 3 includes two conductive rollers 8*a*, 8*b* elastically contacting the wires. As a joint e between the wires Ma and Mb passes through the installation portion of the sensor 8, the rollers 8*a* and 8*b* are short-circuited through the core wire at the joint e to produce the detection signal.

Figure 4:
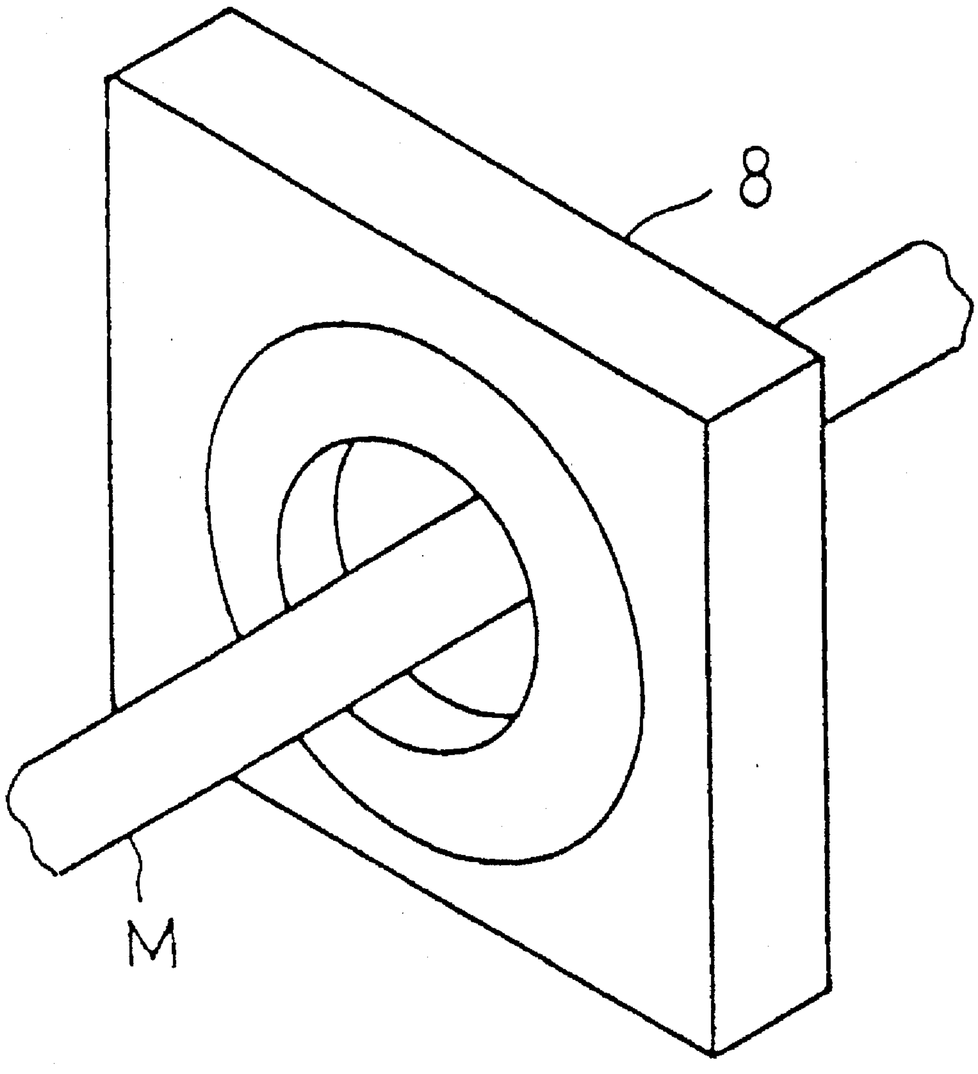
FIG. 4 illustrates another sensor.

Further, a magnetic sensor 8 which is out of contact with the wires as shown in FIG. 4 may be used to detect changes in the amount of conductor at the joint e.

The position arithmetic portion 9 is connected to the cut length setting portion 1, feed detector 33, sensor 8, and removal range arithmetic portion 10.

Figure 6:
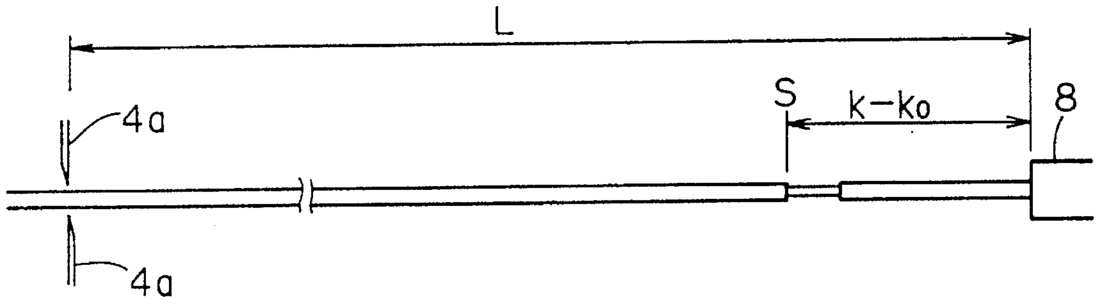
FIG. 6 illustrates the position of a portion to be removed on a wire.

The position arithmetic portion 9 includes a counter for counting the output pulses from the feed detector 33. On receipt of the detection signal from the sensor 8, the position arithmetic portion 9 performs an arithmetic operation represented by Equation (1) to specify a stop position S (FIG. 6) of the portion to be removed at the time when the drive unit 32 of the electric wire length measuring portion 3 stops driving for the next cutting the wire M by the cut length setting portion 1, on the basis of the count C at the time of the detection of the portion to be removed.

$$\frac{\frac{k}{R} \times Q - C}{Q} \times R = k - k_0 \tag{1}$$

where R is the feed per rotation of the feed roller 31B; Q is a resolving power of the rotary encoder of the feed detector 33 (the number of pulses per rotation of the feed roller 31B); k is the length of the harness electric wire set by the cut length setting portion 1; and k0 is the length of the wire corresponding to the count C when the portion to be removed is detected (i.e., k0=RC/Q).

It is apparent from Equation (1) that the stop position S is located "k-k0" downstream of the position of the sensor 8. (See FIG. 6.)

The removal range arithmetic potion 10 performs an arithmetic operation of a removal range of the wire having the portion to be removed. The removal range arithmetic portion 10 includes a removal electric wire rank arithmetic portion 10A, an electric-wire-by-electric-wire position arithmetic portion 10B, and a removal range determining portion 10C.

The removal electric wire rank arithmetic portion 10A determines from Equation (2) in which rank the harness electric wire expected to have the stop position S is to be formed in the wire on the basis of the length L of the wire between the electric wire cut position of the cutting and stripping portion 4 and the sensor 8, the length k of the harness electric wire, and the position S. As the harness electric wires having the length k are sequentially formed, the position S is located in a part of the wire which is expected to provide the n-th harness electric wire calculated from Equation (2).

$$n = INT\left[\frac{L-(k-k_0)}{k}\right] + 1 \tag{2}$$

where INT[X] is a maximum integer which does not exceed X (for example, NT[5.6]=5).

The electric-wire-by-electric-wire position arithmetic portion 10B determines from Equation (3) a distance J from the front end of the n-th harness electric wire to the position of the portion to be removed in the part of the wire which is expected to provide the n-th harness electric wire calculated in the removal electric wire rank arithmetic portion 10A. (See FIGS. 7A and 7B.)

$$J=\left(\frac{L-(k-k_0)}{k}-INT\left[\frac{L-(k-k_0)}{k}\right]\right)\times k \quad (3)$$

The removal range determining portion 10C compares the distance J with a specified value J' to determine whether the cutting edges 4*a* are inserted on the right-hand or left-hand side of the portion to be removed on the basis of the comparison result, to determine the range of the wire to be finally removed. The specified value J' is a minimum distance from the cutting edges 4*a* to the front end (left-hand end in the figure) of the portion to be removed which is set so that the cut position of the cutting edges 4*a* of the cutting and stripping portion 4 does not fall in the portion to be removed in accordance with the removal position sensing accuracy of the sensor 8. The specified value J' is, for example, 50 mm.

Figure 7A:
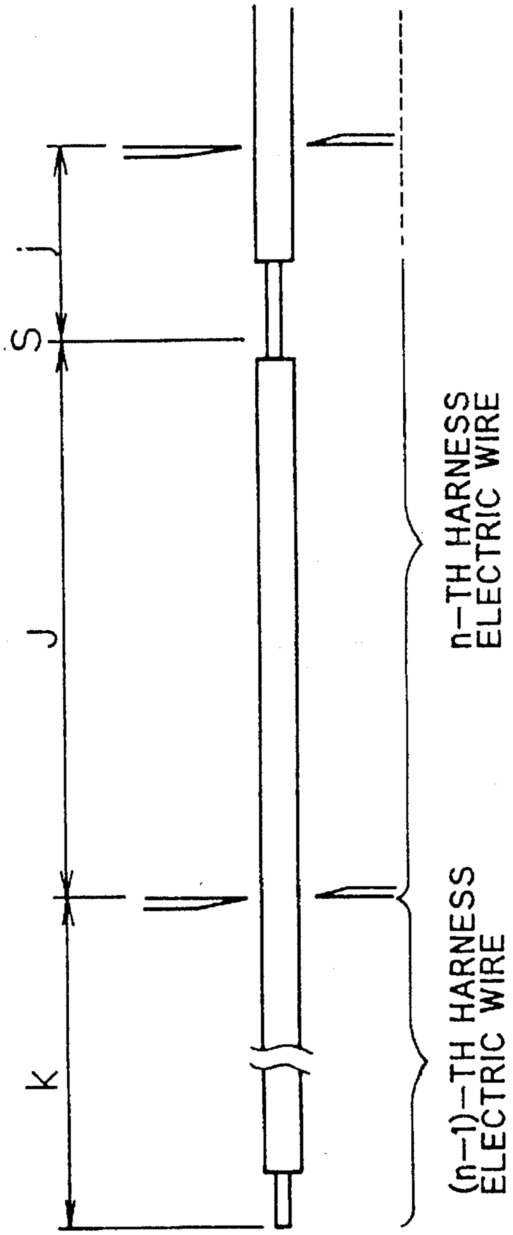
FIGS. 7A and 7B illustrate a removal wire.

When the distance J calculated from Equation (3) is more than the specified value J', the removal range determining portion 10C judges that the relation J>J' holds between the distance J from the position of the cutting edges 4*a* to the position of the portion to be removed at the time of the formation of the (n-1)-th harness electric wire in initially expected rank and the specified value J' as shown in FIG. 7A, to determine that the length of the (n- 1)-th harness electric wire is k on the basis of the judgement result. That is, the cutting edges 4*a* cut the wire M on the left-hand side of the portion to be removed when J>J'. The removal range determining portion 10C then determines cutting of a removal wire of the length J+j (<k) for the n-th harness electric wire where j is a maximum length possible of the portion to be removed (for example, the joint) plus a predetermined additional value. The length of the removal wire J+j permits the wire loss to be minimized for removing the portion to be removed lying in the middle of the n-th harness electric wire.

Figure 7B:
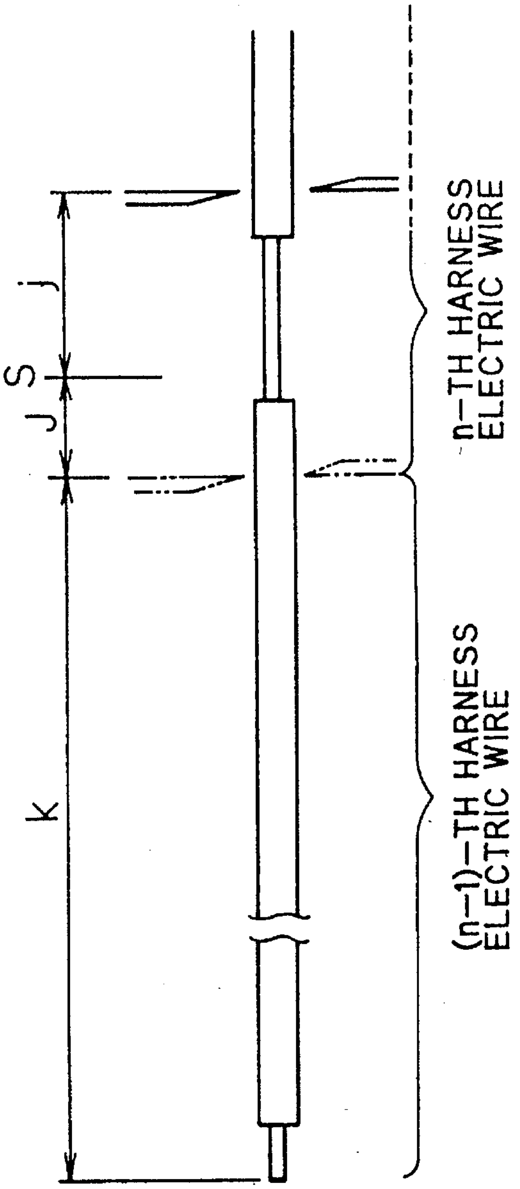

When the distance J calculated from Equation (3) is equal to or less than the specified value J', the removal range determining portion 10C judges that the relation J≦J' holds between the distance J from the position of the cutting edges 4*a* to the position of the portion to be removed at the time of the formation of the (n-1)-th harness electric wire in initially expected rank and the specified value J' as shown in FIG. 7B, to determine that the length of the (n- 1)-th harness electric wire is not k on the basis of the judgement result. That is, the cutting edges 4*a* are not permitted to cut on the left-hand side of the portion to be removed but are inserted on the right-hand side thereof when J≦J'. The removal range determining portion 10C consequently determines cutting of a removal wire of the length k+J+j in place of cutting of the (n- 1)-th harness electric wire.

The removal range determining portion 10C outputs a removal range signal corresponding to the length of the removal wire determined in the above-mentioned manner to the discrimination controller 12 to be described later.

The second stock portion 11 is a stock portion for the removal wires and is positioned downstream of the second terminal crimping portion 6 as well as the first stock portion 7.

The discrimination controller 12 controls the drive unit 32, the cutting and stripping portion 4, and the first and second terminal crimping portions 5 and 6 on the basis of the information from the cut length setting portion 1, the feed detector 33, and the removal range determining portion 10C, and discriminates between the harness electric wires and the removal wires.

The discrimination controller 12 includes a counter for counting the output pulses from the feed detector 33 and normally actuates the cutting and stripping portion 4 to form the harness electric wire of the predetermined length when the count of the counter equals the value set in the cut length setting portion 1. The first terminal crimping portion 5 and second terminal crimping portion 6 sequentially crimp the crimp terminals to connect the crimp terminals to the front and rear ends of the cut harness electric wires. The harness electric wires are stocked in the first stock portion 7. The discrimination controller 12 counts the formed harness electric wires by the counter 13 (FIG. 1) each time a harness electric wire is formed. The counter 13 compares the count of the harness electric wires with a set value which is set by setting means not shown to output a drive interruption command to the discrimination controller 12 when the count equals the set value. The discrimination controller 12 temporarily interrupts the drive of the drive unit 32 on receipt of the drive interruption command.

On receipt of the removal range signal from the removal range determining portion 10C, the discrimination controller 12 temporarily cancels the signal indicative of the length of the harness electric wire given from the cut length setting portion 1 at the time when the harness electric wire immediately preceding the removal wire of the length J+j or k+J+j shown in FIGS. 7A and 7B is cut, and controls the drive unit 32, cutting and stripping portion 4, and first and second terminal crimping portions 5 and 6 on the basis of the removal range signal. On completion of the cutting of the harness electric wire immediately preceding the removal wire, the discrimination controller 12 controls the cutting and stripping portion 4 only once so that the wire M is cut when the count of the pulses corresponds to the length of the removal wire given from the removal range signal, and stocks the cut removal wire in the second stock portion 11 directly without transferring the removal wire to the crimping position of the first and second terminal crimping portions 5 and 6.

After the formation of the removal wire, the discrimination controller 12 operates again on the basis of the signal indicative of the length of the harness electric wire given from the cut length setting portion 1.

Figure 8:
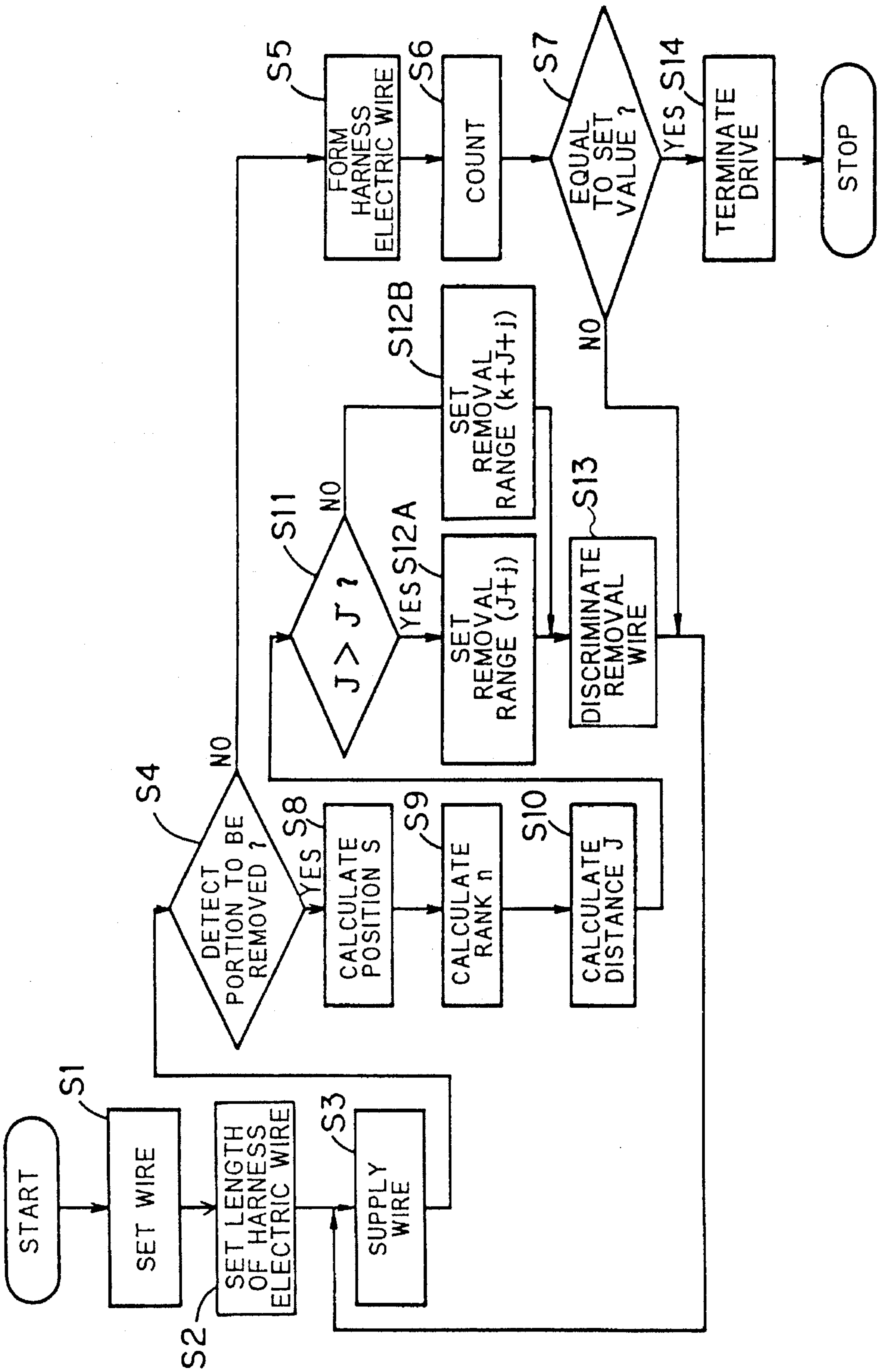
FIG. 8 is a flow chart showing a method of making the harness electric wire.
Figure 9:
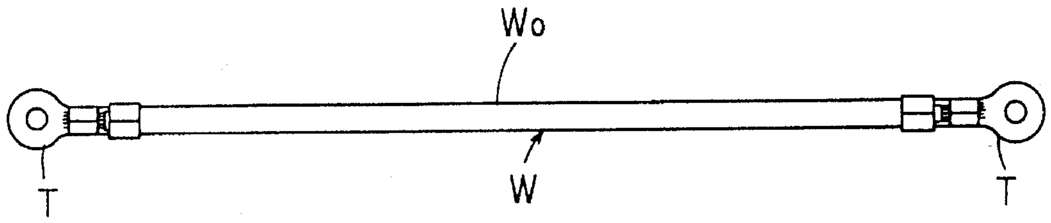
FIG. 9 illustrates the harness electric wire.

The apparatus as above constructed makes the harness electric wire W of FIG. 9 in the procedure of FIG. 8 to prevent parts of the wire to be formed into the harness electric wires W from having the portion to be removed such as a joint.

In the step S1, the wire drawn out of the coil of wire in the wire supply portion 2 is set on a supply path extending from the electric wire length measuring portion 3 to the cutting and stripping portion 4.

In the step S2, the length of the harness electric wire to be made is set in the cut length setting portion 1.

In the step S3, the drive unit 32 of the electric wire length measuring portion 3 is actuated to feed the wire from the coil of wire in the wire supply portion 2 toward the cutting and stripping portion 4.

In the step S4, the sensor 8 judges whether a portion to be removed on the wire is detected or not. If no portion to be removed is detected, the apparatus proceeds to the step S5. If the sensor 8 detects a portion to be removed, the apparatus proceeds to the step S8.

The normal process is continued in the step S5. The normal process includes the steps of cutting the wire by the cutting and stripping portion 4 each time the electric wire of the length measured by the electric wire length measuring portion 3 passes through the cutting and stripping portion 4, crimping the terminals to connect the terminals to opposite ends of the cut electric wire by the first and second terminal crimping portions 5 and 6, and stocking the harness electric wire having the terminals connected to its opposite ends in the first stock portion 7.

In the step S6, the counter 13 counts the harness electric wires formed in the step S5.

Whether the count of the harness electric wires in the step S6 is equal to the set value is judged in the step S7. If the count is equal to the set value, the apparatus proceeds to the step S14, and driving of the apparatus is temporarily interrupted. If the count is not equal to the set value, the apparatus returns to the step S3.

In the step S8, the position arithmetic portion 9 calculates from Equation (1) the position S of the portion to be removed at time t1 at which the cutting edges 4*a* of the cutting and stripping portion 4 cut the wire next. Upon calculating the position S, the apparatus proceeds to the step S9.

In the step S9, the removal electric wire rank arithmetic portion 10A of the removal range arithmetic portion 10 calculates from Equation (2) which harness electric wire, if counting from the time t1, to be formed from the wire becomes the removal wire, that is, the rank n of the harness electric wire corresponding to the removal wire.

In the step S10, the electric-wire-by-electric-wire position arithmetic portion 10B calculates the distance J from the front end of the harness electric wire corresponding to the removal wire to the portion to be removed from Equation (3).

Whether the distance J is more than the specified value J' is judged in the step S11. If (distance J)>(specified value J'), the apparatus proceeds to the step S12A. If (distance J)≦(specified value J'), the apparatus proceeds to the step S12B.

In the step S12A, the removal range determining portion 10C sets the range J+j of the removal wire substituted for the n-th harness electric wire calculated in the step S9.

In the step S12B, the removal range determining portion 10C sets the range k+J+j of the removal wire substituted for the (n-1)-th harness electric wire immediately preceding the n-th harness electric wire calculated in the step S9.

In the step S13, the discrimination controller 12 discriminates between the normal harness electric wires and the removal wires whose range is set in the step S12A or S12B. After the discrimination in the step S13, the apparatus returns to the step S3.

The above-mentioned method for making an electric wire .for a harness provides for distinguishable production of the harness electric wires formed from the wire having the defective portion such as the joint by the steps S4, S8 to S13. The steps S5 to S7 enables the predetermined number of harness electric wires to be only the normal harness electric wires.

The removal process of the removal wires after the discrimination may be accomplished by provision of the first and second stock portions as described in the preferred embodiment or by informing of the discharged removal electric wires by means of a buzzer or a winking light at the time of the discharge.

Furthermore, the discriminating means for the removal wires may be omitted without special need.

Since the removal wires differ in length from the acceptable products and have no terminals connected to its opposite ends, the removal wires may be visually identified without difficulty if discharged together with the acceptable products without the automatic removal. This greatly simplifies the operation of searching for the defective wires if the discrimination is carried out by an operator.

Figure 5:
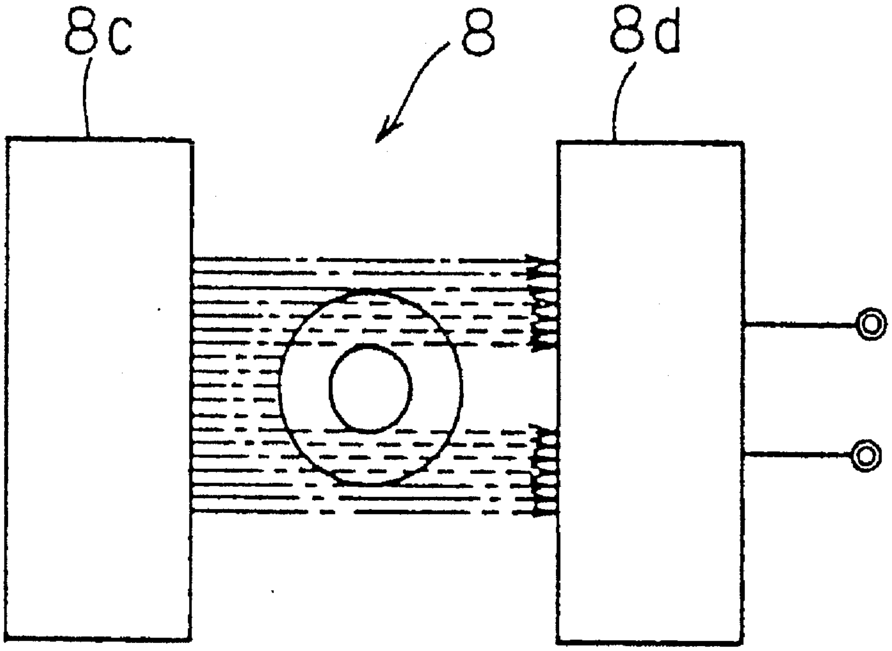
FIG. 5 illustrates still another sensor.

The sensor 8 may optically detect the portion to be removed as shown in FIG. 5. When the joint c which is not coated passes through the sensor 8 of FIG. 5, the light receiving portion 8d receives the output light from the light emitting portion 8*c* in a larger area than ever to output the detection signal. The sensor 8 of FIG. 5 is capable of detecting defective portions such as a flaw or a node-like portion on the wire by detecting changes in the amount of light received by the light receiving portion 8d.

Alternatively, the sensor 8 may detect the portion to be removed by image processing of the wire passing therethrough. Further, the sensor 8 need not be a single sensor but may include a combination of sensors having some functions. Recapitulating to some extent, the sensor 8 may be any sensor which has predetermined function and performance capable of detecting the portion to be removed on the wire.

While the invention has been shown and described in detail, the foregoing description is in all aspects illustrative and not restrictive. It is therefore understood that numerous modifications and variations can be devised without departing from the scope of the invention.

What is claimed is:

1. A method of making an electric wire for a harness, said method including cutting a supplied wire at a predetermined cut position to form said harness electric wire of a predetermined length, said method comprising the steps of:

detecting a portion to be removed from said wire at a predetermined location upstream of said cut position in a supply direction of said wire;

determining the length of a first part of said wire between said cut position and said predetermined location;

determining the number of harness electric wires of the predetermined length formed from the first part of said wire on the basis of the length of the first part of said wire and the length of said harness electric wire and determining the range of a removal wire from the first part of said wire, said removal wire being other than a second part of said wire corresponding to the determined number of harness electric wires and having said portion to be removed; and cutting opposite ends of said removal wire at said cut position to separate said removal wire.

2. The method of claim 1, wherein the range of said removal wire is determined by adding a predetermined length previously set for said portion to be removed of a maximum length possible to the length of a third part of said wire which is other than the second part of said wire in the first part of said wire.

3. An apparatus for making an electric wire for a harness, said apparatus including a wire cutter for cutting a supplied wire to form said electric wire of a predetermined length, said apparatus comprising:

a sensor positioned upstream of said wire cutter in a supply direction of said supplied wire for detecting a portion to be removed from said supplied wire and to output a detection signal based thereon;

a position element for specifying the position of said portion based on said detection signal;

a wire distinguisher for determining the position of said portion based on said detection signal and information as to the length of said electric wire, a discriminator for differentiating between said electric wire and wire containing said portion cut from said supplied wire based on information determined by said wire distinguisher.

4. An apparatus for making an electric wire for a harness, said apparatus including a wire cutter for cutting a supplied wire to form said electric wire of a predetermined length, said apparatus comprising:

a sensor positioned upstream of said wire cutter in a supply direction of said supplied wire for detecting a portion to be removed from said supplied wire and to output a detection signal based thereon;

a position element for specifying the position of said portion based on said detection signal;

a wire distinguisher for determining the position of said portion based on said detection signal and information as to the length of said electric wire, said position element indicating the position of said portion relative to a reference position at a time, said wire distinguisher including a first arithmetic element for calculating in which said electric wire to be formed, said portion is located at said time after detection of said portion by said sensor based on a position of said portion, a length of said electric wire, and a distance from said reference position to a cutting position of said wire cutter, a second arithmetic element for determining a distance from a front end of said electric wire, having said portion, to the position of said portion, and a removal element for determining a section, containing said portion, of said supplied wire to be removed based on said distance.

5. The apparatus of claim 4 wherein said sensor is out of contact with said supplied wire.

6. The apparatus of claim 4 wherein said sensor includes a magnetic sensor for detecting a change in the amount of conductivity.

7. The apparatus of claim 4 wherein said sensor includes a light receiver and a light emitter, said wire lying therebetween.

8. The apparatus of claim 4 wherein said sensor is in contact with said wire.

9. The apparatus of claim 4 wherein said sensor includes a pair of conductive rollers resiliently contacting said wire.

10. The apparatus of claim 4 further comprising an encoder for detecting a feed of said supplied wire fed to said wire cutter, said position element including a counter for counting output pulses from said encoder.

11. The apparatus of claim 4 comprising a discriminator for differentiating between said electric wire and said section cut from said supplied wire based on information determined by said wire distinguisher.

12. A method of making an electric wire for a harness, said method including cutting a supplied wire at a predetermined cut position to form said electric wire of a predetermined length, said method comprising detecting a portion to be removed from said supplied wire at a point upstream of said cut position in a supply direction of said supplied wire;

determining the position of said portion; and specifying a removal section of said supplied wire having said portion based on the position of said portion relative to a reference position at a time, and the length of said electric wire, said specifying comprising calculating in which said electric wire to be formed is located at said time after detection of said portion based on the position of said portion, the length of said harness electric wire, and a distance from said reference position to said cut position, determining a distance from a front end of said electric wire to said portion and specifying said removal section on the basis of said distance.

13. The method of claim 12 wherein, if said distance is less than a specified value, according to the accuracy of said detecting, an electric wire located immediately preceding said electric wire having said portion is included in said removal section.

* * * * *